United States Patent Office 3,024,268
Patented Mar. 6, 1962

3,024,268
PRODUCTION OF DIALKYL SUCCINYL-SUCCINATES
William S. Struve, Chatham, N.J., assignor to E. I. du Pont de Nemours and Company, Wilmington, Del., a corporation of Delaware
No Drawing. Filed Oct. 28, 1957, Ser. No. 692,580
8 Claims. (Cl. 260—468)

This invention relates to the condensation of dialkyl succinates, and this application is a continuation-in-part of my copending application Serial No. 523,921, filed July 22, 1955, now U.S. Patent 2,821,541.

It is well known that dialkyl succinates can be condensed with the aid of an alkali metal alkoxide, such as a sodium alkoxide. This condensation may be illustrated as follows:

EQUATION I

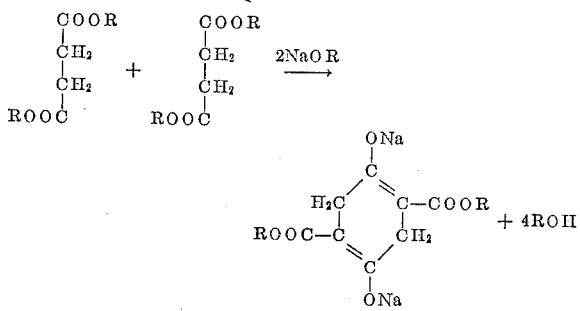

The cyclized product of the above equation is the disodium salt of the enol form of dialkyl succinylsuccinate. It may also be referred to as the disodium derivaitve of a dialkyl cyclohexa-1,4-diene-2,5-diol-1,4-dicarboxylate. For many uses, and particularly for ease of purification, it is frequently desirable to convert the cyclized product of Equation I to its keto form. This may be accomplished by the addition of acid, and the reaction is illustrated by Equation II which follows:

EQUATION II

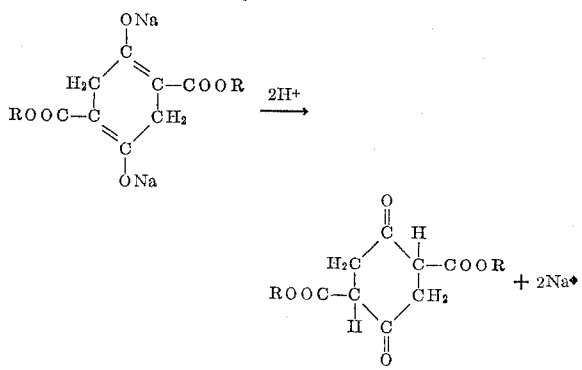

The cyclized end product of Equation II may be referred to as dialkyl succinylsuccinate or the dialkyl ester of 2,5-diketo-hexahydro-terephthalic acid, or the dialkyl ester of cyclohexane-2,5-dione-1,4-dicarboxylic acid.

A study of Equation I indicates that the reaction releases 4 mols of alcohol per mol of the disodium derivative formed. At this point, it is possible for 2 mols of the alcohol to be bound in a complex with the disodium derivative. However, upon acidification, as shown in Equation II, the free dialkyl succinylsuccinate is obtained.

Dialkyl succinylsuccinates, as well as their disodium derivatives, are well known and useful compounds. For instance, they may be converted by appropriate reactions to terephthalic acid. The latter compound is used in the production of polyester films and fibers. Moreover, as set forth more fully in my copending application Ser. No. 523,921, now U.S. Patent 2,821,541, dialkyl succinylsuccinates can be condensed with aromatic amines to form intermediates which are useful in the manufacture of quinacridones which, in turn, are of great utility as red to violet pigments. Reactions which use dialkyl succinylsuccinates can be found in the literature. For example, see Beilstein, "Handbuch der Organischen Chemie" (Berlin), 4th edition (and supplements), vol. X.

The invention described herein is concerned with the condensation of dialkyl succinates, as shown in the above equations. It has been found that new and improved results, particularly shorter reaction times and increased yields, are obtained when a dialkyl succinate is contacted with an alkali metal alkoxide in the presence of an organic diluent which is liquid under reaction conditions and has a boiling point above that of any alcohol formed in the reaction.

Among the organic diluents suitable for use in this invention are the following materials, used singly or in admixture with each other: diphenyl oxide, and paraffinic, aromatic and cyclic hydrocarbons. If the dialkyl succinylsuccinate produced in this invention is to be subsequently condensed with an arylamine, such as aniline, as in my copending application Ser. No. 523,921, now U.S. Patent 2,821,541, it is preferable to carry out the reaction in an inert high-boiling liquid; i.e., a liquid which boils above the arylamine used in the reaction. Inert liquids boiling between 240–300° C. are especially suitable. However, inert liquids boiling above 300° C. can also be used. When such a diluent is employed in preparing the dialkyl succinylsuccinate, it is possible to carry out the subsequent condensation of the dialkyl succinate with the arylamine without removing the succinate from the reaction medium in which it was prepared. At the same time, the use of this high-boiling diluent makes it possible to ultimately remove unreacted amine by distillation.

Paraffinic hydrocarbons which may be used in this invention include those found in mineral oils, such as "Nujol." Suitable aromatic hydrocarbons include alpha and beta methyl naphthalenes and biphenyl. It is also contemplated to use alicyclic hydrocarbons, such as those found in naphthenic-base lubricating oils. In fact, any inert hydrocarbon mineral oil boiling above 250° C. is suitable regardless of the chemical structure of the hydrocarbons contained therein. The amount of organic diluent used can be widely varied. In selecting the amount to be used, one should consider that fluidity should be maintained in the reaction mixture and that the amount of diluent is not so great that the reaction would be unreasonably retarded by insufficient contact between reactants. One skilled in the art can easily select an amount which will fit these conditions. A recommended range for the amount of diluent is 2.5 to 10 times the weight of the dialkyl succinate to be reacted.

The procedural steps of this invention are relatively easy to carry out. For example, a convenient procedure when using an aromatic hydrocarbon, such as biphenyl, is to first prepare an alkoxide, such as sodium ethoxide, in the biphenyl by adding a suspension of powdered sodium to the biphenyl and slowly adding a slight molecular excess of absolute ethyl alcohol at such a rate that the reaction temperature is maintained below about 60° C. When this reaction is complete, the required amount of dialkyl succinate (e.g., diethyl succinate) is added, and the mixture is heated rapidly to a temperature of 100–110° C. and held at this temperature for a period of time approximating 4 hours. At this point, the disodium derivative of diethyl succinylsuccinate is in suspension in the biphenyl and can be isolated by filtration. However, it is the usual procedure to isolate the cyclized end product in the form of the free diethyl succinylsuccinate. This can be accomplished by cooling the reaction mixture, solubilizing the disodium derivative by drowning in water, separating from the biphenyl by decantation, acidifying the water solution to precipitate the free diethyl succinylsuccinate, filtering, washing free of soluble salts and drying. If desired, further purification of the ester can be attained by dissolving the ester in hot ethyl alcohol and then recrystallizing it by cooling. Other high-boiling liquids, such as a mixture of diphenyl ether and biphenyl (e.g., 76.5% diphenyl ether and 23.5% biphenyl) used according to the above procedure give outstanding results.

For a clearer understanding of the invention, the following specific examples are given. These examples are intended to be merely illustrative of the invention and not in limitation thereof. Unless otherwise specified, all parts are by weight.

*Example I*

A suitable vessel for carrying out the process of this invention is a glass-lined reactor equipped with an efficient agitator, a distillation column and a product condenser above the column. The vessel is also jacketed for control of temperature by circulation of a suitable heat transfer liquid. It should also be equipped for the application of a vacuum through the condenser system and for sweeping the atmosphere in the vessel with an inert gas.

250 parts of 23.5% biphenyl and 76.5% diphenyl oxide is charged to a vessel of this description and of such a size that it will not be more than about one-third filled. The contents of the vessel are heated to about 120° C. and oxygen is purged from the vessel by sweeping with nitrogen gas, then applying vacuum and relieving the vacuum with nitrogen gas. Then, 10.35 parts of sodium metal cut into small pieces is added. The charge is allowed to stand without agitation until the sodium is melted, whereupon vigorous agitation is effected to break up the molten sodium into small pellets. The charge is then cooled to 55–60° C. maintaining an atmosphere of nitrogen at all times. With the agitator running, 24 parts of anhydrous ethyl alcohol (denatured with 5% methanol) is then added slowly (over a period of about 6 hours) at such a rate that the temperature does not exceed about 75° C. After the addition of the alcohol, the temperature is maintained between 70° C. and 80° C. for about 2 hours. Then, 50 parts of diethyl succinate is added rapidly and the charge heated to 95–100° C. over a 2½ hour period and held at 95–100° C. for about 7 hours, maintaining good agitation and an atmosphere of nitrogen at all times. The mixture is then added to about 1000 parts of a mixture of ice and water so that the final temperature is not above about 50° C. Upon vigorous agitation, the disodium derivative of the diethyl succinylsuccinate is dissolved in the water. At this point about 250 parts of benzene is added to promote the separation of the organic liquid from the aqueous layer, and the charge is allowed to stand until such a separation takes place. The organic liquid (a mixture of benzene, biphenyl, and diphenyl oxide) is decanted from the aqueous layer which is then made slightly acid with acetic acid precipitating the diethyl succinylsuccinate in its keto form. The product is isolated by filtration and then washed with water. It is further purified by solution in denatured ethyl alcohol and recrystallized. 29.4 parts of product melting at about 126–127° C. is obtained. This corresponds to an 80% yield.

*Example II*

The difference between this example and Example I is that the disodium derivative obtained in Example I is neutralized to the keto form in the presence of the organic diluent in which the resulting keto form is soluble. This neutralization is represented by Equation II above.

The disodium derivative is prepared as in Example I, but instead of adding the mixture to 1000 parts of ice and water, as in Example I, the discharge is neutralized by ading a slurry of 40 parts of sodium bicarbonate in about 200 parts of water at about 50° C., stirring for about 20 minutes, letting stand until an aqueous layer forms in the bottom of the vessel and drawing off the aqueous layer which contains most of the impurities. The diethyl succinylsuccinate remains in solution in the mixture of biphenyl and diphenyl oxide. The charge is then washed with a solution of 50 parts of sodium chloride in 300 parts of water at about 70° C. and the aqueous layer again withdrawn from the bottom of the vessel. This procedure results in a solution of diethyl succinylsuccinate in the organic diluent mixture composed of biphenyl and diphenyl oxide. This solution is particularly suitable for subsequent condensation with an aromatic amine, such as aniline, as shown in Example I of my copending application Ser. No. 523,921, now U.S. Patent 2,821,541.

As an alternative to the procedure of this example, it is possible to isolate the diethyl succinylsuccinate from the organic diluent by extracting it as the disodium derivative with a relatively strong solution of an alkali, such as sodium hydroxide, which is immiscible with the organic diluent. The addition of the sodium hydroxide results in the formation of an aqueous layer containing the disodium derivative and this layer can be separated from the organic diluent. (The separation is very much improved by the addition of a substantial amount of an organic liquid of low specific gravity, such as benzene.) The separated aqueous layer is acidified to bring about the formation of the diethyl succinylsuccinate, which can then be recovered.

*Example III*

The procedure is that of Example I with the exceptions noted below. 250 parts of biphenyl is used as the diluent instead of the mixture of biphenyl and diphenyl oxide, and since the M.P. of biphenyl is 69–71° C. the temperature during the operation is never allowed to go below about 75° C. 17 parts of anhydrous methanol is used in place of the denatured anhydrous ethanol used in Example I, and 42 parts of dimethyl succinate is used in place of the diethyl ester of the first example. After isolation and recrystallization of the final product, there is obtained dimethyl succinylsuccinate with a melting point of 153° C.

In the preparation of the alkali metal alkoxide, sodium is the preferred metal for the reason that it is readily available at low cost and can be handled with a reasonable degree of safety. Although the other alkali metals, such as lithium and potassium, are not as convenient to handle, they can be used to obtain equally good results. In the examples, alkoxides have been prepared from anhydrous methanol and anhydrous ethanol, but it is contemplated that higher alcohols, such as isopropanol, propanol, or the butyl alcohols and the like could be used in the reaction. It is generally desirable that the alcohol-derived portion of the alkoxide should correspond to the alcohol-derived portion of the succinic acid ester. The amount of alcohol used should be at least molecularly equivalent to the amount of sodium, and in many cases, it is desirable to use a slight excess of alcohol, say about 5%, to promote the solubility of the sodium alkoxide in the reaction mixture.

It will be seen from Equation I above that stoichiometric amounts for the condensation are 1 mol of alkoxide per mol of alkyl succinate. Excellent results are obtained when the amount of alkali metal alkoxide is in slight molecular excess over the dialkyl succinate. A preferred ratio of alkoxide to dialkyl succinate is 1.1:1 to 2:1. The preferred succinic acid esters for use in this reaction are the lower dialkyl succinates, such as the dimethyl, diethyl, and the dipropyl succinates.

Preferred reaction temperatures range from 100–110° C. and as a broader range reaction temperatures from 90–120° C. are contemplated. Temperatures slightly below and above this latter range are also contemplated.

The question of an inert atmosphere in this reaction is largely one of avoiding an explosive mixture with the hydrogen generated in the reaction between the sodium and the alcohol. It is a desirable step, but not essential for success. However, if a subsequent condensation with an arylamine is carried out in the same reaction mixture, as shown in my copending application Ser. No. 523,921, now U.S. Patent 2,821,541, the non-oxidizing conditions are essential to the efficient utilization of this subsequent reaction.

The nature of the product resulting from this reaction and the means of isolation can be varied depending upon the ultimate use to be made of the product. At the completion of the condensation, the product is in the enol form as its disodium salt and appears to be in the nature of an alcohol complex thereof. Simple filtration from the organic medium at this point will isolate this enol form of the dialkyl succinylsuccinate. However, as previously pointed out, it is frequently desirable to isolate the product in its keto form, and this is readily accomplished by extracting the disodium salt from the mixture by drowning the mixture in a large volume of cold water in which this disodium salt is readily soluble. At this point, any unreacted ester and some of the possible by-products remain in solution in the organic medium which can be readily separated by decantation. Neutralization of the aqueous solution to a pH at least as low as about 9 and preferably in the range of about 6 to 8 readily converts the disodium derivative of the enol form to the free keto form of the dialkyl succinylsuccinate, which is substantially insoluble in water and may be readily isolated therefrom by filtration. Moreover, any succinic acid resulting from hydrolysis of the original dialkyl succinate during the reaction remains in the aqueous solution together with the alcohol which is a by-product of the reaction. During the neutralization, it is desirable to avoid a large excess of strong acids since such strong acids may result in hydrolysis of the final product of this reaction. Consequently, careful neutralization with acetic acid or with acid salts of relatively weak acids, such as sodium bicarbonate, monosodium phosphate, or monocalcium phosphate, is preferred.

The advantages of this invention that have already been mentioned are shorter reaction times and increased yields. In addition to these, the invention also provides a smoother reaction and an end product which is easy to use in subsequent reactions. Moreover, the use of the process of this invention minimizes the tendency of the reaction to reverse with the consequent hydrolysis of the dialkyl succinylsuccinate.

Since it is obvious that many changes and modifications can be made in the above-described details without departing from the nature and spirit of the invention, it is to be understood that the invention is not to be limited to said details except as set forth in the appended claims.

I claim:
1. A process for the production of an alcohol complex of a dialkali metal derivative of a lower dialkyl cyclohexa-1,4-diene-2,5-diol-1,4-dicarboxylate which comprises reacting a lower dialkyl succinate with an alkali metal alkoxide in the presence of an organic diluent which is liquid under reaction conditions and has a boiling point above 240° C., said diluent being selected from the group consisting of diphenyl oxide, paraffinic, aromatic, and cyclic hydrocarbons and mixture thereof.

2. A process for the production of a lower dialkyl cyclohexane-2,5-dione-1,4-dicarboxylate which comprises reacting a lower dialkyl succinate with an alkali metal alkoxide in the presence of an organic diluent which is liquid under reaction conditions and has a boiling point above 240° C., said diluent being selected from the group consisting of diphenyl oxide, paraffinic, aromatic, and cyclic hydrocarbons, and mixtures thereof, and then neutralizing the reaction mixture to produce said lower dialkyl cyclohexane-2,5-dione-1,4-dicarboxylate.

3. A process for the production of an alcohol complex of a dialkli metal derivative of cyclohexa-1,4-diene-2,5-diol-1,4-dicarboxylate which comprises condensing a lower dialkyl succinate in a mixture of biphenyl and diphenyl oxide in the presence of an alkali metal alkoxide.

4. A process for the production of a lower dialkyl cyclohexane-2,5-dione-1,4-dicarboxylate which comprises condensing a lower dialkyl succinate in a mixture of biphenyl and diphenyl oxide in the presence of an alkali metal alkoxide, and neutralizing the reaction mixture to produce said lower dialkyl cyclohexane-2,5-dione-1,4-dicarboxylate.

5. The process of claim 4 in which the dialkyl succinate is diethyl succinate and the alkali metal alkoxide is sodium ethoxide.

6. The process of claim 4 in which the dialkyl succinate is dimethyl succinate and the alkali metal alkoxide is sodium methoxide.

7. The process of claim 1 wherein said succinate is dimethyl succinate and the alkali metal alkoxide is an alkali metal methoxide dissolved in methanol.

8. The process of claim 1 wherein said succinate is diethyl succinate and said alkali metal alkoxide is an alkali metal ethoxide dissolved in ethanol.

References Cited in the file of this patent

UNITED STATES PATENTS

| | | |
|---|---|---|
| 2,782,220 | Ingram | Feb. 19, 1957 |
| 2,821,541 | Struve | Jan. 28, 1958 |